US005983264A

United States Patent [19]

Gardner

[11] Patent Number: 5,983,264

[45] Date of Patent: Nov. 9, 1999

[54] NETWORK-BASED MAIL PIECE GENERATION

[75] Inventor: David P. Gardner, New Milford, Conn.

[73] Assignee: Pitney Bowes Inc., Stamford, Conn.

[21] Appl. No.: 08/772,367

[22] Filed: Dec. 23, 1996

[51] Int. Cl.[6] .......... G06F 13/38

[52] U.S. Cl. .......... 709/206; 709/246

[58] Field of Search .......... 705/406; 395/200.36, 395/200.37, 200.33, 200.61; 379/100.09, 100.08, 93.24; 709/206, 207, 203, 231, 107, 246

[56] References Cited

U.S. PATENT DOCUMENTS

| | | | |
|---|---|---|---|
| 4,207,598 | 6/1980 | Reich et al. | 379/100.09 |
| 4,837,701 | 6/1989 | Sansone et al. | 364/464.03 |
| 4,868,757 | 9/1989 | Gil | 364/464.03 |
| 5,051,914 | 9/1991 | Sansone et al. | 705/406 X |
| 5,068,797 | 11/1991 | Sansone et al. | 705/406 X |
| 5,072,401 | 12/1991 | Sansone et al. | 705/406 X |
| 5,077,694 | 12/1991 | Sansone et al. | 705/406 |
| 5,257,196 | 10/1993 | Sansone | 364/464.02 |
| 5,257,197 | 10/1993 | Gunther et al. | 364/464.02 |
| 5,271,322 | 12/1993 | Palma | 101/333 |
| 5,341,505 | 8/1994 | Whitehouse | 395/800 |
| 5,387,783 | 2/1995 | Mihm et al. | 235/375 |
| 5,437,441 | 8/1995 | Tuhro et al. | 270/1.1 |
| 5,805,810 | 9/1998 | Maxwell | 395/200.36 |

*Primary Examiner*—Zarni Maung
*Assistant Examiner*—Patrice Winder
*Attorney, Agent, or Firm*—Charles R. Malandra, Jr; Melvin J. Scolnick

[57] ABSTRACT

A Mail Generation Computer (MGC) is connected to a Local Area Network (LAN) at a customer site having a mail generation facility. A desktop PC on the LAN, under user control, accesses the MGC and submits a mail job to the MGC via the LAN. The MGC responds to the request and calls various mail piece generation modules needed to implement the request, thus freeing the user's equipment for other uses. The invention includes a job coordinator module for the MGC, to call, run and coordinate the various modules. The system embodied in the server thus allows any user at the customer site to submit a job to a process implemented on the LAN, which generates a finished mail piece or pieces, thus freeing the user from control over each portion of the mail generation process and similarly freeing the user's equipment for implementing other tasks.

9 Claims, 3 Drawing Sheets

NETWORK-BASED MAIL PIECE GENERATION

BACKGROUND OF THE INVENTION

This invention relates to mail piece generation facilities, and more particularly to method and apparatus for connection of any of a plurality of user stations to such facilities on a Local Area Network (LAN) in order to generate mail pieces by implementing a plurality of required processes, independently of control, monitoring or supervision by the user station thus leaving facilities of the user station free to engage in other tasks.

Generation of a completed mail piece is a procedure involving several processes which must be implemented after a document has been prepared. Preparation of a document may include printing of the document and packaging the document in an envelope. However, prior to turning over the envelope to the U.S. Postal Service for delivery, several steps are typically implemented by organizations which dispatch large quantities of mail.

For example, the postal service requires placement on the mail pieces of identifying postal codes, such as zip codes, in prescribed formats. Additionally, it is necessary to imprint postal indicia, such as a postage value, on the mail pieces. Moreover, large mail senders who use expanded ZIP code barcodes, or who pre-package and presort their mail, are given a lower postage rate by the postal service because of the resulting time saving for the service. Senders thus typically use such ZIP code barcoding, and presort and package their mail to obtain the discounted postage rate.

Software driven mail processing systems are known which obtain and print zip codes for particular addresses, and specifically which print a barcode (or other form) of the zip code to enable automated handling by the postal service. One such system is disclosed in U.S. Pat. No. 5,341,505, which discloses a user station, including at least a personal computer, a printer, and a communication device. The communication device may communicate with a service agency such as a local post office, or a with a LAN, to obtain ZIP+4data for example. The user station further operates with a software module to encode the outgoing mail, by using a user station printer for printing barcodes. U.S. Pat. No. 5,387,783 provides another system for inserting barcode graphics into a mail piece.

Other systems are known for printing postal indicia on mail pieces, as illustrated by U.S. Pat. No. 4,837,701, the contents of which are incorporated herein by reference. As disclosed in the '701 patent, a customer site may include a single server, which includes a secure unit with a capability for accounting for postage values, a central unsecured printer for applying addresses to the mail pieces, and a central secure printer. The server communicates with a post office or a central station which is in communication with the post office. The central station may be the location of a postage meter manufacturer or other accountable organization. At the customer site, the server may be connected with a plurality of work stations. Each work station may include an inserter and a local unsecured mail piece printer.

Interconnection between the server and work stations may be implemented as a form of multitasking, where the server directly controls operation of a number of separate printer-inserter combinations. Alternatively, slave units may be associated with the various work stations. The slave units may be implemented as sub-servers, duplicating the components of the server though not within a secure housing, and contacting the server rather than the remote central station contacted by the server.

Control interconnection between the work stations and the server involves transfer of data including process control codes, postage information, headers and authorization numbers, for example, and permits the various work stations, which are located on a network at the customer location, to act independently of each other.

Still other systems are available for sorting large numbers of mail pieces based on various criteria, such as postal codes. One such bar code sorter is illustrated in U.S. Pat. No. 4,868,757 as being used in a post office.

Each of the above described systems, however, operates independently of the others, requires individual attention of a user, and occupies the user's equipment during operation.

A proliferation of desktop computer facilities at all levels of a modern office environment has resulted in increased demand for easy access to mail piece generation facilities from users'desktop computers. Because it is impractical to purchase the above described mail generating facilities for each of many user stations distributed throughout a customer site, or to provide a complete mail generation facility having printing, postal coding, and presort capabilities for each of the user stations, there is typically provided a single, centralized, mail piece generation facility serving a large number of users. However, such an arrangement does not satisfy demands for access to the facility at each user station.

In an attempt to provide mail generation capabilities at various desktop PC stations some customers have invested in both training and technology of the type described above, including facilities for implementing appropriate data access and sharing, postal coding and presort for getting postage discounts, as well as for implementing advanced printing and finishing of mail pieces. As above noted, however, at present there does not exist apparatus for providing each of these (and other) capabilities, in an integrated fashion, to each user station at the customer site, without costly and undesirable duplication of equipment. Instead, each of the above described elements must be separately used at, or accessed from, a central facility in order to implement a mail piece generating operation.

Thus, even when all the above features are available to users at such customer sites, the users at the individual user stations may rely on the central facility to process mailing tasks, postage generating tasks and the like. Drawbacks result when a central facility must be used to implement mail generation, in requiring that the user (or a designated employee) collect mail pieces at the workstation, transport the same to the central facility, and wait for the facility to become available to perform its functions.

Desires for increases in flexibility and for reductions of time loss and turn-around time have resulted in a need to improve such a mail handling operation, and to provide for each user a direct and immediate access to the mail piece generation facility, without requiring the user to leave his or her work space, or to wait for appearance of a designated mail courier or availability of the central facility. The present invention addresses this long felt need.

With presently available technology such a need may only be met as noted above, by providing access at desktop computers of the various work stations to several individual mail generation capabilities. For example, with present technology there may be provided at each user station various pieces of equipment and software to implement, under control and supervision of the user, the various separate mail processing tasks performed by remote central equipment, including a printing process, a postal coding process, and a presort process.

Central equipment including these separate facilities may be connected to each user via a local area network (LAN). FIG. 1 shows a configuration which could be used to implement such an approach. In such a configuration the above described duplication of equipment would be eliminated. However, as shown in FIG. 1, in order to generate a mail piece the user must control communication with several mail generating modules at a remote (central) mail piece generating facility, not shown, via a LAN 10 which then controls a printer 12 at the user station. Such control of the printer may be implemented by a network server 14 of the LAN, which communicates with a computer 16 (such as a personal computer, or PC) at the user's workstation in accordance with an operating mail module to drive printer 12.

However, as shown in the figure, the user continues to be responsible for monitoring and/or control of the mail piece generation process. That is, the user must run each piece of software required for each step of the mail piece generation process. For example, the user must access and control a known postal coding module, a known presort module, a known printer driver, and a known network driver while connected with the LAN. Little is automated for the user. Thus, even if such a mail generation capability were provided at a user's desk by LAN connection to a centrally located facility, this approach would tie up the user's computer and printer for the amount of time it takes to produce all of the mail pieces, a process which could take several hours.

In each of the above described possibilities, the user must either operate each piece of equipment, or remotely supervise operation of each piece of software, required to implement the various processes associated with mail piece generation. Moreover, even where duplication of equipment would be eliminated by use of a LAN, the user's workstation, including the computer and printer, nonetheless remains connected to, and occupied by, the mail piece generation process. Thus, equipment present at the various user stations is unavailable for other tasks.

SUMMARY OF THE INVENTION

It is accordingly an object of the present invention to overcome the above described drawbacks of the prior art, and to provide a facility enabling efficient mail piece generation at each of a plurality of user stations at a single customer site having a centralized mail piece generation facility.

It is a more particular object of the invention to provide, at each of a plurality of locations within a customer site having a central mail generation facility, a mail piece generation capacity which permits a user at that location to generate mail independently of other users, without need for physical access to the central facility.

It is still a more specific object of the invention to provide a mail generation apparatus which permits a user, at any of a plurality of locations within a customer site having a central mail generation facility, to generate mail automatically at that location, independently of other users and without tying up the user's equipment, particularly including a user computer and a user printer, for the duration of the entire mail generation process.

It is another object of the invention to provide a mail generation apparatus for a site having a LAN, wherein the apparatus integrates separate mail generation processes and, in response to information supplied by a user on the LAN, coordinates and implements the processes identified by the user to produce a finished mail piece, thereby freeing the user and the user station to participate in other tasks while the mail piece is being generated.

The present invention meets the above described need, solves the above noted problems, and provides desktop PC access to mail piece generation capabilities, while freeing the user's equipment for other uses. Towards that end, the invention provides a specialized server which integrates separate mail generation processes. When the server is attached to a customer's computer interconnection facility, such as a LAN, the server responds to a job submitted by a user to implement the requested process or processes integrated therein to generate a finished mail piece or pieces.

In accordance with one facet of the invention, there is provided a method for generating a finished mail piece on a LAN, which includes the steps of responding, at a mail piece generating computer connected to the network, to a request from a user station for generating a mail piece, accessing each of a plurality of program modules required to generate the mail piece, coordinating operation of the accessed plurality of program modules, and producing the finished mail piece under control of the mail piece generating computer independently of the user station, thereby permitting the user station to implement additional tasks while the mail piece is being produced.

The method further may include identifying specific tasks required to generate the mail piece, and accessing respective program modules implementing the identified specific tasks.

Moreover, in accordance with another aspect of the invention, there is provided a mail piece generating apparatus, which includes connections to each of a plurality of user stations, a programmed server, the server including a plurality of program modules, and being programmed for implementing a plurality of operations, including: responding to a user station request for generating a finished mail piece; accessing each program module required for implementing said request; controlling operation of each program module accessed for implementing the request; coordinating operations of each program module, and producing the finished mail piece independently of the user station, thereby permitting the user station to implement additional tasks while the mail piece is being produced by the programmed server.

The server may particularly be programmed for identifying program modules required to implement tasks needed to produce the mail piece when responding to the request, and for accessing each identified program module when implementing the plurality of operations.

These and other objects, features and advantages of the present invention will become readily apparent to those skilled in the art from the following description and drawings, wherein there is shown and described a preferred embodiment of the invention, simply by way of illustration and not of limitation of one of the best modes (and alternative embodiments) suited to carry out the invention. The invention itself is set forth in the claims appended hereto. As will be realized upon examination of the specification and drawings and from practice of the same, the present invention is capable of still other, different, embodiments and its several details are capable of modifications in various obvious aspects, all without departing from the scope of the invention as recited in the claims. Accordingly, the drawings and the descriptions provided herein are to be regarded as illustrative in nature and not as restrictive of the invention.

BRIEF DESCRIPTION OF THE DRAWINGS

The accompanying drawings, incorporated into and forming a part of the specification, illustrate several aspects of a preferred embodiment of the present invention and, together with the description, serve to explain the principles of the invention. In the drawings.

DETAILED DESCRIPTION OF THE PREFERRED EMBODIMENT

Figure 1:
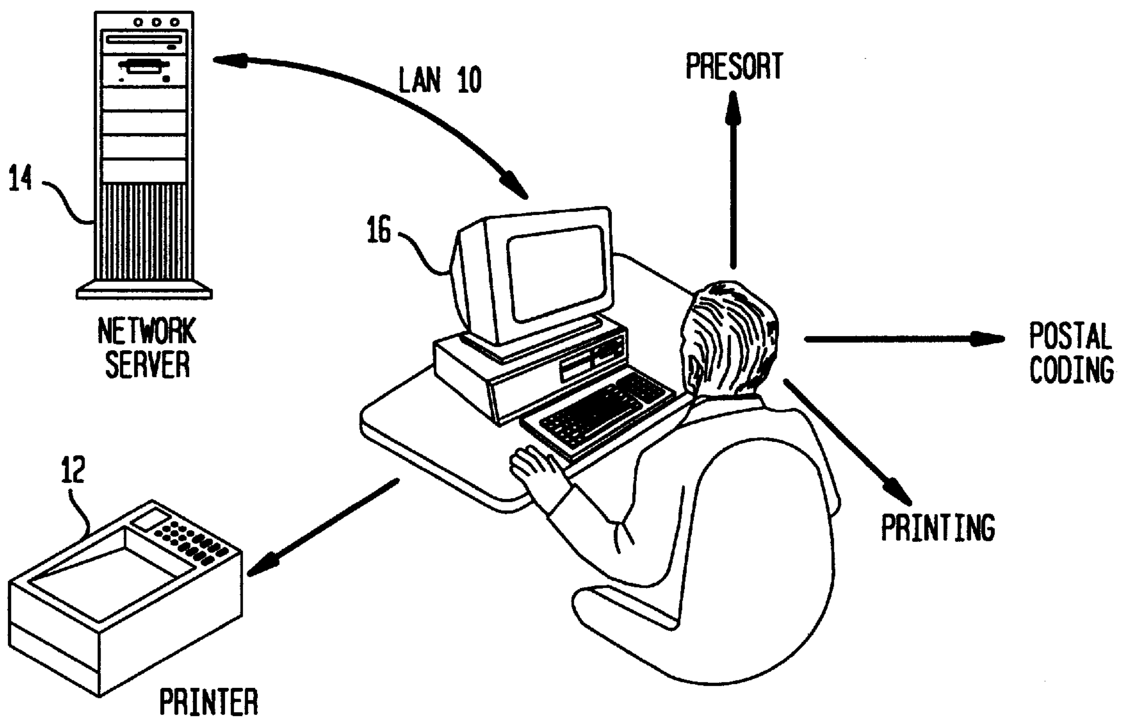
FIG. 1 illustrates a process of generating a mailing using a known LAN configuration.

Referring now to the drawings, as previously described FIG. 1 shows an overall user controlled process for generating a mailing in an environment without benefit of the present invention. As shown therein, a user communicates with a mail piece generating facility (remote from the user's work station) via a LAN 10 to request implementation of a particular process. The mail piece generating facility implements the process requested by the user under control of known software, and then becomes ready to implement another process, requested by the same or another user. The processes may include, but are not limited to, postal coding, printing and presorting. Other mail generating processes may also be implemented by the remote facility. Upon implementation of a particular process the network server 14 provides data and control signals from the remote facility to the user's PC 16 in a known manner, to indicate completion thereof as well as to provide interactive communication with the user as may be required for such completion. For processes requiring a printing operation, server 14 conveys printer control signals from the remote facility for driving the user's printer 12.

Thus, the user must access, control and run each piece of software required for each step in the process, such as a postal coding module, a presort module, a printer driver, and the network driver itself. Because of such involvement, the user is precluded from performing other useful functions while controlling the mail generation process. Additionally, the user's computer 16 and printer 12 are also kept busy for the duration of the mail piece generation process, and thus may be precluded from operating on other tasks.

The inventive system modifies the above described interaction between the user and the remote mail piece generating facility, and permits a mail piece generation facility in accordance with the invention to be accessed from and used by the user's work station, without requiring the user's constant attention, interaction with or control of the facility or of the various process modules implemented thereby. Thus, the invention frees the user to work on other tasks, as well as to move away from the work station, without adversely impacting on the mail piece generation process. Moreover, by taking over control and coordination of the entire mail generation operation, the invention frees the user's PC 16 and printer 12, as well as any other local components of the user's work station, to operate in connection with other tasks as necessary.

Figure 2:
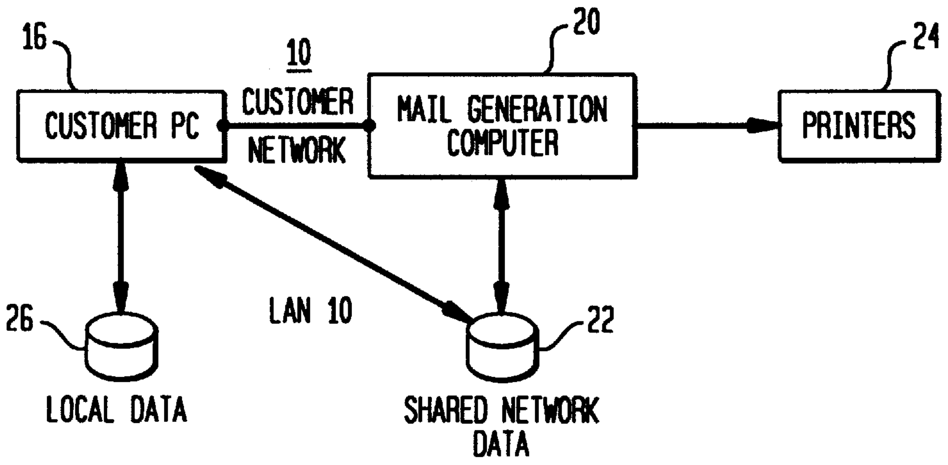
FIG. 2 shows a customer site including a mail generation computer in accordance with the invention.

The overall system of the invention is shown in FIG. 2. As shown therein, in accordance with the invention there is provided a Mail Generation Computer 20 (MGC) which is connected to LAN 10 of the customer site. The MGC 20 uses the LAN 10 to control activation and operation of various postal function modules. When a mail generation function requires a printer, MGC 20 accesses and controls a printer 24 of the system. Printer 24 may be a central printer for the mail piece generation facility, a printer at another station, or may be the user's own printer 12. In each case, except when MGC 20 is implementing a printing operation, the invention frees printer 12 at the user's work station to participate in other tasks and operations, as printer 12 is only used in the mail piece generation process when needed.

As shown in FIG. 2, the invention is configured to retain a LAN connection between the user's PC 16 and various shared network data and programs 22, so that other interactions between the user and the LAN, as well as with other stations and devices on the LAN, remain unchanged.

In operation, when requiring access to the remote facility to implement a mailing operation, a user submits a mail job from PC 16 to MGC 20 via LAN 10. Such a job is represented by a data packet which contains headers designating source and destination of the packet for example, as well as other data describing the communication via the LAN, and information pertinent to the mail piece. The information provided to the MGC may detail the contents of the mail piece and instructions on how the mail piece should be generated and processed, by providing process control codes, postage information, headers and authorization numbers as known in the art. More particularly, in order to permit coordination and integration of several software modules to generate a finished mail piece, the data packet identifies the specific module or modules to be accessed to implement the specific job request, and includes information needed by the specific module(s) to implement the postal function(s) thereof.

For example, where the postal coding module is being accessed, an address typed at the user work station may be captured automatically and provided to the postal coding module, to enable the module to access and obtain the expanded ZIP code therefor. Alternatively, the information may be supplied by the user when generating the request.

It is a significant feature of the invention that, by placing MGC 20 on LAN 10 rather than in direct communication with only a single station, known sophisticated mail generation capabilities are made available to every user connected to the LAN. Moreover, once a user provides the mail job information packet to the MGC, that user's involvement with the process terminates until the finished mail piece has been generated and the job has been completed. Thus, the invention frees the user (and that user's equipment) for involvement with other tasks.

Figure 3:
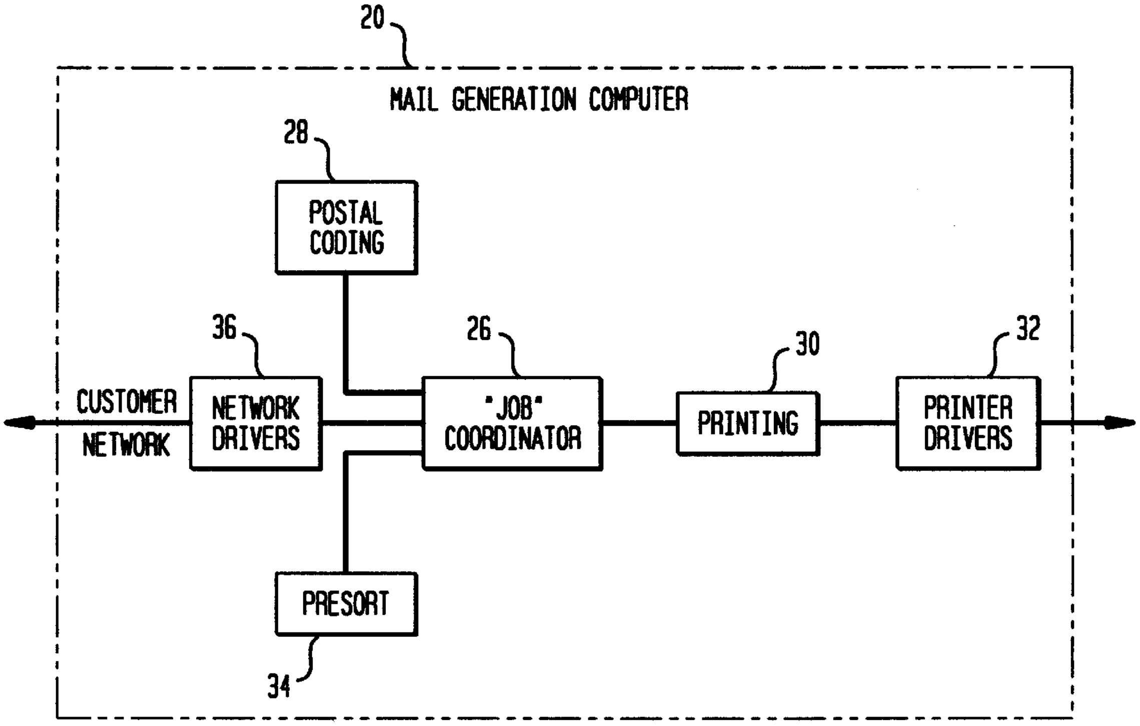
FIG. 3 shows details of the mail generation computer of the invention.

FIG. 3 provides details of the MGC and its interconnection to the customer site facility. As shown therein, a job received from the network is provided to a job coordinator software module 26. The job coordinator module 26 receives the information packet from the user, interprets the packet, identifies the modules being accessed in the MGC, and verifies that the necessary information is provided thereto. When necessary information is omitted, job coordinator module 26 generates a missing-information request for the user to supply the missing information.

Where all such missing-information requests are generated prior to initiating operation of the various modules, the user receives only a single request and, upon responding thereto (whether by overriding the request or supplying the omitted information), the job coordinator calls each module, provides the necessary information thereto, obtains appropriate results and drives a printer to generate the finished mail piece. For example, in the above described example, job coordinator 26 examines the data packet associated with a particular job request, determines that postal coding is required, calls postal coding module 28, obtains the appropriate postal coding and, upon completion of the mail piece, calls printing module 30 which selects appropriate printer drivers 32 drive a particular printer (such as the job originating user's printer 16), and prints the finished mail piece.

Where a sorting function is to be implemented in accordance with the specific mail job, coordinator 26 calls presort module 34 which then implements the sorting process. As clear from FIG. 3, appropriate network drivers 36 are included in MGC 20 to enable communication with the various users and facilities of the LAN.

Thus, it is the job coordinator software 26, rather than the user, that is connected to, communicates with and controls postal coding module 28, presort module 34, as well as the printing module 30 and any other module that may be incorporated in MGC 20. The user is relieved from further responsibility with respect to the specific job and is free to attend to other tasks. Similarly, the user's printer 12 is free to participate in other tasks, as the MGC may control system printer 24 to generate the mail piece. Even when communicating with printer 12 at the user workstation, however, the job coordinator 26 preferably defers a printing operation until conclusion of the mail job, so that the user's printer 12 is not tied up unnecessarily.

Figure 4:
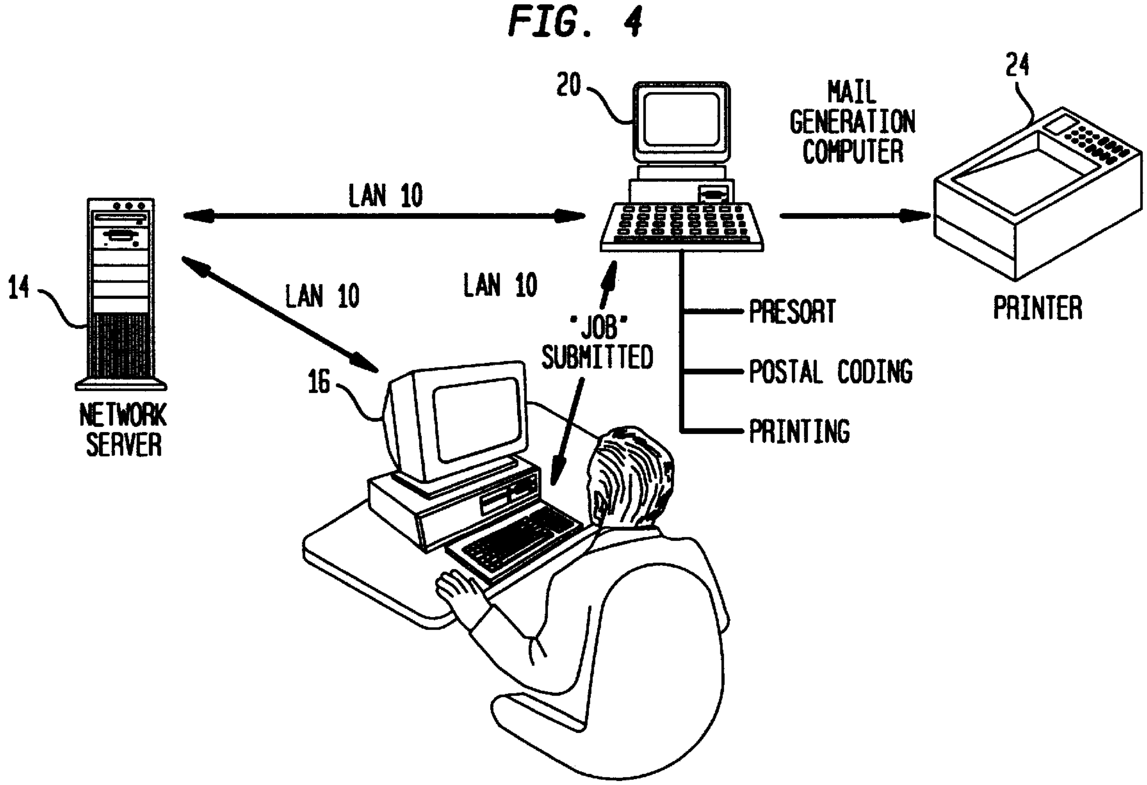
FIG. 4 shows a process of mail piece generation using the invention.

FIG. 4 shows the manner in which the MGC offloads the user's computer, by allowing the user to decide how the mail pieces should be produced, by implementing the appropriate processes independently of the user, and then by submitting a job to be printed. As illustrated in FIG. 4, the user submits a job to MGC 20, including an appropriate data packet identifying the job, the processes to be used, and the necessary information to be incorporated therein. Once all necessary information is provided, MGC 20 coordinates operation of the various software modules and provides the finished mail piece on printer 24. The user thus is not required to run each piece of software or to wait for completion of the various steps involved therein, all of which are performed by the MGC.

Figure 5:
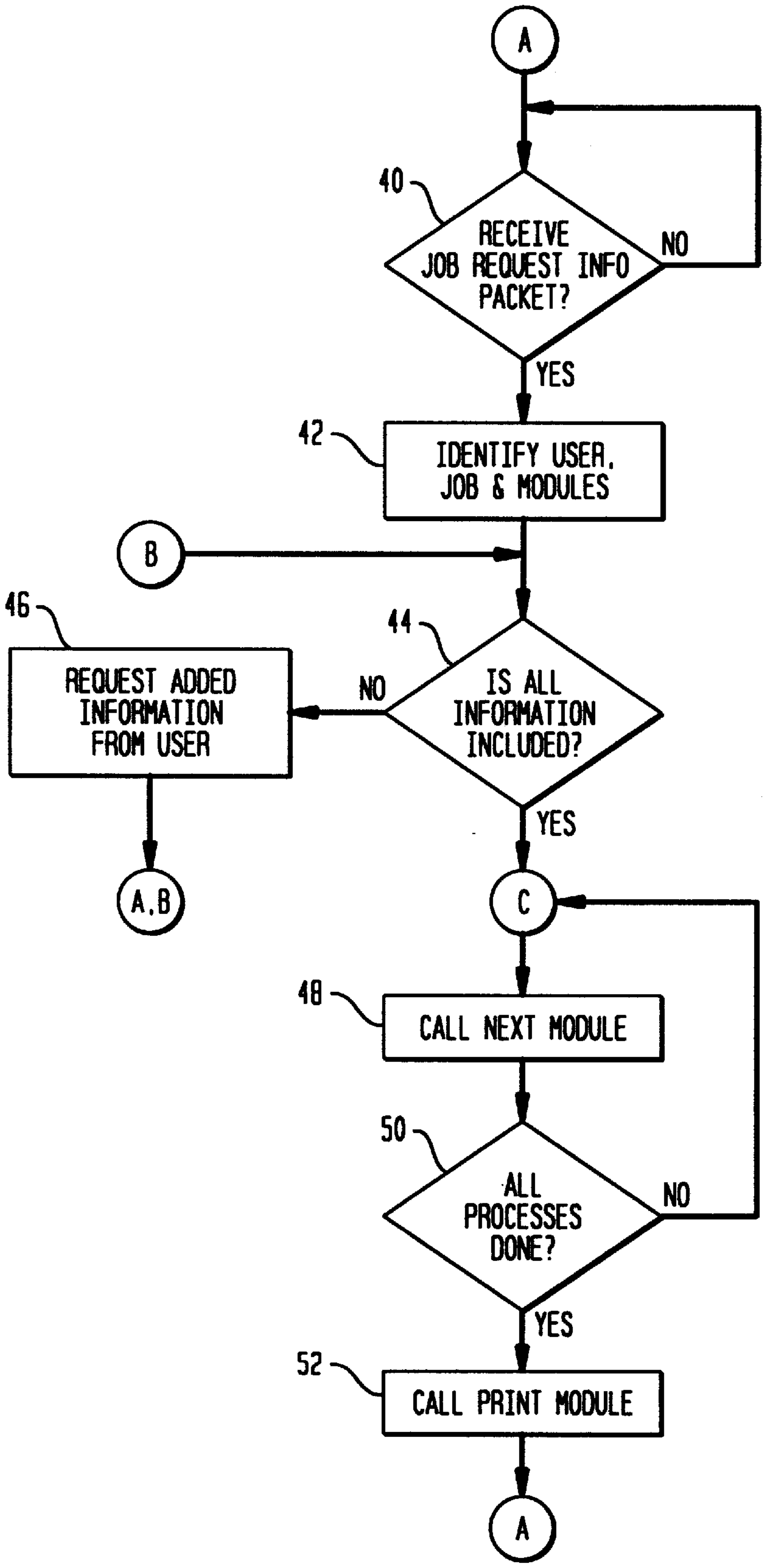
FIG. 5 is a flow chart illustrating operation of a job coordinator module in the mail generation computer of FIG. 2.

FIG. 5 provides a flow chart illustrating operation of the MGC 20, and particularly operation of job coordinator module 26, in accordance with the foregoing. At a control point A, the job coordinator awaits receipt of a job requesting information packet. When it is determined at a step 40 that such an information packet has been received, the sending user and specific mail job are identified at step 42, thus providing information identifying each module which needs to called to complete the requested mail generation operation. At a step 44 in the control sequence, the job coordinator may determine whether all the information necessary to implement the identified modules has been supplied (or overridden by specific user direction). Where information is lacking, or is not accounted for by specific user direction, a request is generated at step 46 for display on the requesting user's PC, prompting the user to supply the missing information.

After generating the information request, job coordinator 26 may transfer operation to a point B, and to await receipt of a response to that request. Thus, once the information is received, operation continues at step 44. Alternatively, it may be desirable that the MGC not be kept idle while waiting for such a response. That is, where appropriate it may be preferred that incomplete job requests, which fail to supply the complete information necessary to implement the mail job, lose their turn in queue. Thus, after generating the request at step 46, job coordinator 26 may return to point A to await any further mail job request, from any user. The two alternatives are indicated by use of the designation "A,B" to symbolize the continuation point at the exit from step 46.

When it is determined at step 44 that all the information necessary to implement the modules identified in a job request has been supplied (or overridden by specific user direction), job coordinator module 26 begins to perform the requested mail piece generation by calling upon the various modules. After initialization of a counter for example (not shown), step 48 identifies the next module required by the job. Job coordinator module 26 calls the module identified at step 48. Upon receiving return information from the called module to indicate completion of its function, or upon receiving therefrom the requested information necessary to continue with the mail job, the job coordinator determines at step 50 whether all modules have been called.

A negative response at step 50 results in return to point C in the sequence to call the next required module. Where the next module relies on information returned by a previously completed module, the return information so obtained may be passed on to the next called module at this point in the control sequence. A positive response at step 50, which indicates completion of the various operations of the requested mail job, is thus also indicative of the fact that the mail piece is finished and ready for printing. Accordingly, at step 52 the control sequence generates a call for the print module 30, in order to print the finished mail piece.

Thus, by implementing control in accordance with the flow chart illustrated at FIG. 5, or in accordance with any other appropriate sequence which may occur to those skilled in the art, the MGC of the present invention attains its objectives.

From the foregoing it will be appreciated that the present invention provides a major new component for marrying various individual postal processing modules to a LAN, thus permitting each of a plurality of users to have full access to a mail generation facility at his or her PC, freely and without limitation on usage of the facility due to utilization by other users, and at the same time without limiting the user's ability to use the PC or the LAN for other purposes.

Specifically, the invention provides a self-contained turnkey computer which is connected to the customer's LAN, and which has sufficient intelligence to implement mail piece generation using known modules in accordance with instructions provided by a submitter of a mail job. Various advantages of the invention are attained by including in the mail generation computer a managing software module that interprets a request, determines which modules must be called in order to generate the mail piece, and which then generates the mail piece(s) based on the submitter's instructions.

The foregoing description of the preferred embodiment of the invention has been presented for purposes of illustration and description. It is not intended to be exhaustive or to limit the invention to the precise forms disclosed, since many modifications or variations thereof are possible in light of the above teaching. All such modifications and variations are within the scope of the invention. The embodiment described herein was chosen and described in order best to explain the principles of the invention and its practical application, thereby to enable others skilled in the art to utilize the invention in various embodiments and with various modifications as are suited to the particular use contemplated therefor. It is intended that the scope of the invention be defined by the claims appended hereto, when interpreted in accordance with the full breadth to which they are legally and equitably entitled.

I claim:

1. In a local area network, the improvement comprising mail piece generating apparatus, including a programmed computer connected to the network, said computer programmed for implementing a plurality of operations, said operations including:

(a) responding to a request from a user station connected to the network for generating a finished mail piece requiring implementation of a plurality of tasks, said request including an identification of a plurality of program modules respectively required for implementing said plurality of tasks;

(b) accessing said plurality of program modules identified in said request, (c) coordinating operation of said plurality of program modules identified in said request and transferring information there among, and (d) producing said finished mail piece independently of the user station, thereby permitting the user station to implement additional tasks while the mail piece is being produced.

2. An improved local area network as recited in claim 1, wherein said user station includes a user computer means, said programmed computer being further programmed to free said user computer means at said user station requesting generation of the mail piece to perform additional tasks while said programmed computer implements said plurality of operations to produce the finished mail piece.

3. An improved local area network as recited in claim 1, wherein said user station includes a printer, said programmed computer being further programmed to free said printer of said user station requesting generation of the mail piece to perform additional printing tasks while said programmed computer implements said plurality of operations to produce the finished mail piece.

4. An improved local area network as recited in claim 3, wherein said user station includes a user computer means, said programmed computer being further programmed to free said user computer means at said user station requesting generation of the mail piece to perform additional tasks while said programmed computer implements said plurality of operations to produce the finished mail piece.

5. Mail piece generating apparatus, including connections to each of a plurality of user stations, and a programmed server computer means, said server computer means including therein a plurality of operations, including:

(a) responding to a user station request for generating a finished mail piece, said request including an identification of a plurality of program modules required for implementing said request;

(b) accessing each program module identified in said request;

(c) controlling operation of said each program module accessed for implementing said request;

(d) coordinating operations of said each program module accessed for implementing said request; and (e) producing said finished mail piece independently of the user station, thereby permitting the user station to implement additional tasks while the mail piece is being produced by said server computer means.

6. Mail piece generating apparatus as recited in claim 5, wherein each of said plurality of user stations includes a user computer means, said server computer means being further programmed to free a user computer means at a user station requesting generation of the mail piece to perform additional tasks while said server computer means implements said plurality of operations to produce the finished mail piece.

7. Mail piece generating apparatus as recited in claim 5, wherein each of said plurality of user stations includes a printer, said server computer means being further programmed to free a printer of a user station requesting generation of the mail piece to perform additional printing tasks while said server computer means implements said plurality of operations to produce the finished mail piece.

8. Mail piece generating apparatus as recited in claim 7, wherein each of said plurality of user stations includes a user computer means, said server computer means being further programmed to free a user computer means at a user station requesting generation of the mail piece to perform additional tasks while said server computer means implements said plurality of operations to produce the finished mail piece.

9. In a local area network, a method for generating a finished mail piece including the steps of:

(a) responding at a mail piece generating computer connected to the network to a request from a user station for generating a mail piece, said request including an identification of a plurality of program modules required to generate the mail piece;

(b) accessing said plurality of program modules identified in said request;

(c) coordinating operation of said accessed plurality of program modules; and (d) producing said finished mail piece under control of said mail piece generating computer independently of the user station, thereby permitting the user station to implement additional tasks while the mail piece is being produced.

* * * * *